Nov. 27, 1956    J. C. FISCHER, JR    2,772,057
CIRCULAR AIRCRAFT AND CONTROL SYSTEM THEREFOR.
Filed Jan. 29, 1954    2 Sheets-Sheet 1
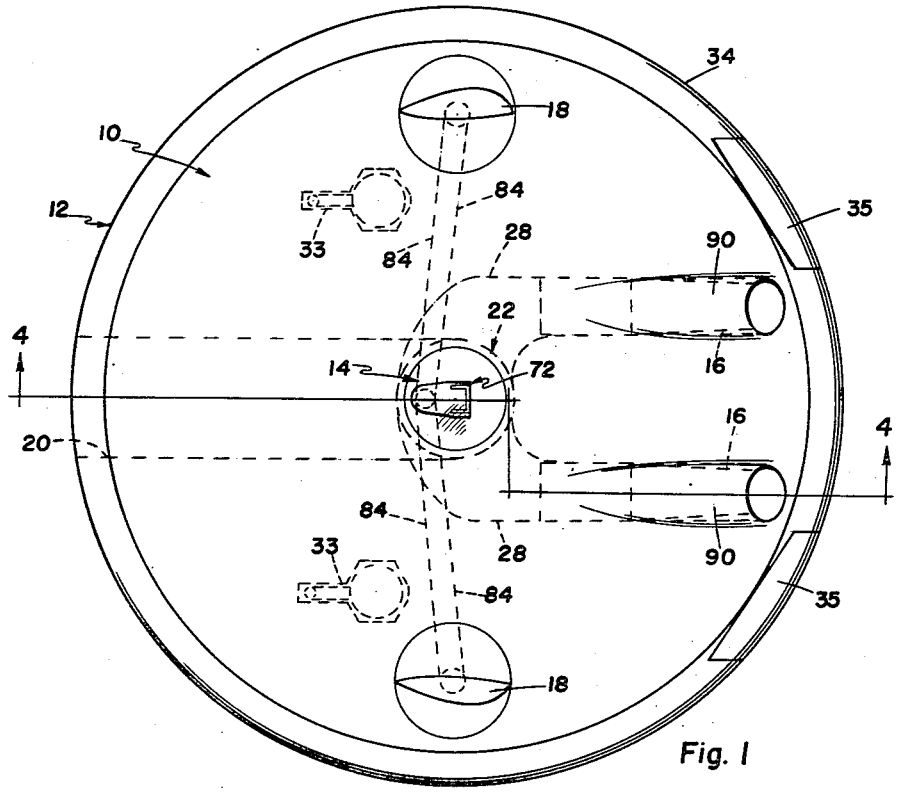
Fig. 1
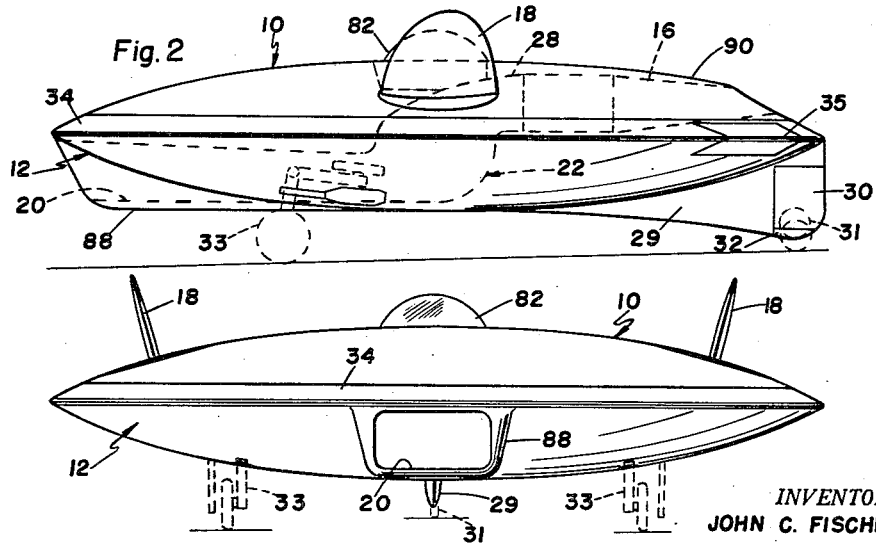
Fig. 2
Fig. 3
INVENTOR.
JOHN C. FISCHER, JR.
BY
Knox & Knox
ATTORNEY IN FACT
FOR APPLICANT Nov. 27, 1956  J. C. FISCHER, JR  2,772,057
CIRCULAR AIRCRAFT AND CONTROL SYSTEM THEREFOR
Filed Jan. 29, 1954  2 Sheets-Sheet 2
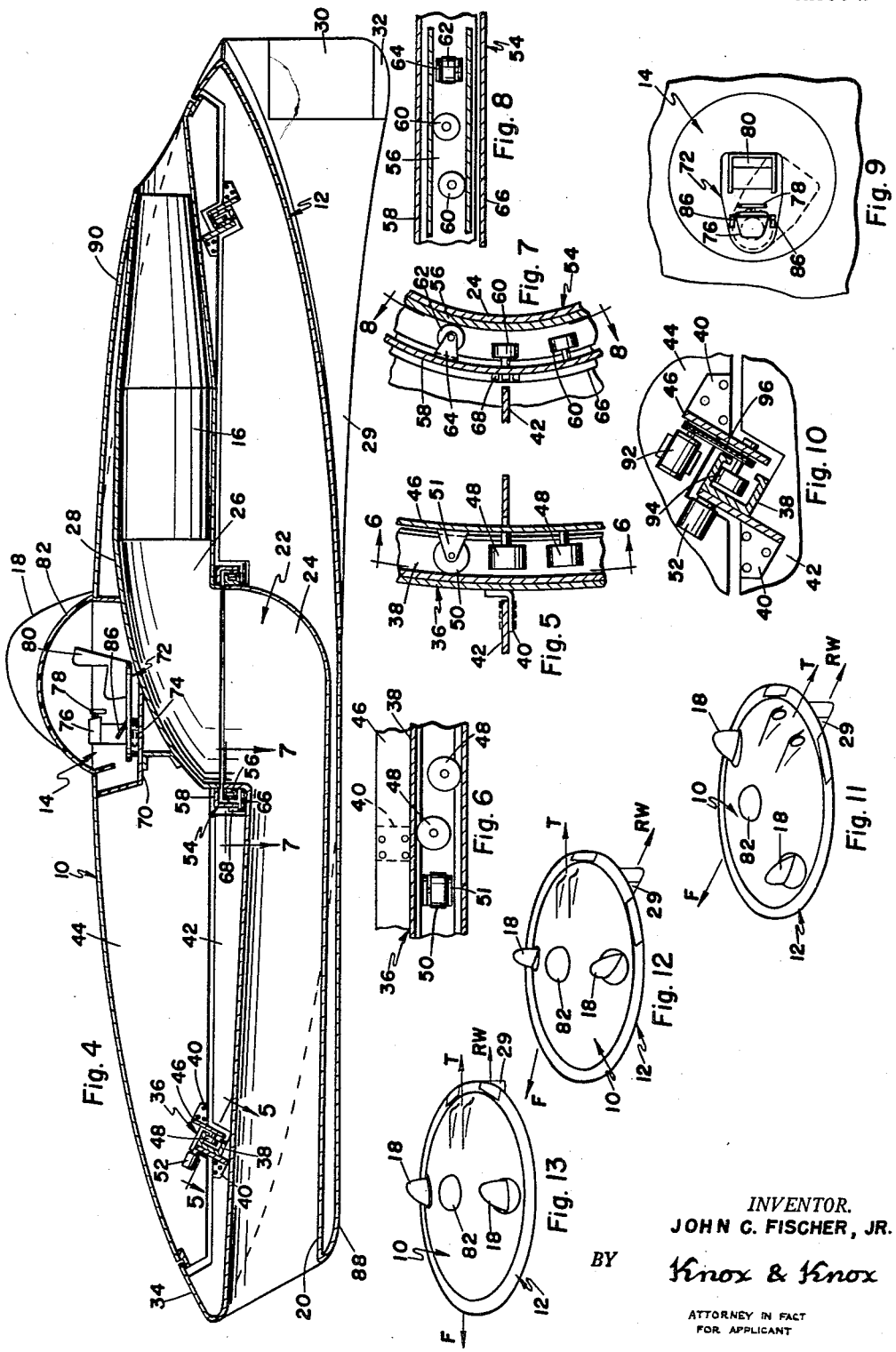
INVENTOR.
JOHN C. FISCHER, JR.
BY
Knox & Knox
ATTORNEY IN FACT
FOR APPLICANT United States Patent Office 2,772,057
Patented Nov. 27, 1956

2,772,057

CIRCULAR AIRCRAFT AND CONTROL SYSTEM THEREFOR

John C. Fischer, Jr., San Diego, Calif.

Application January 29, 1954, Serial No. 406,974

15 Claims. (Cl. 244—15)

The present invention relates generally to aircraft and more particularly to a circular aircraft and control system therefor.

The primary object of this invention is to provide a circular aircraft having a rotatably adjustable upper portion containing the propulsion means, and a mechanism for rotating the upper portion to alter the direction of thrust to obtain directional control of the aircraft.

Another object of this invention is to provide such an aircraft in which the lower portion has a stabilizing fin which tends to remain in parallel relation with the direction of relative wind while the aircraft is in flight. Thus during a turn, the lower portion of the aircraft is always aligned with the relative wind, so that normal pitching and rolling control of the aircraft may be maintained at all times, the lower portion also containing the control surfaces necessary for such maneuvers.

Another object of this invention is to provide an aircraft which is capable of sharp, flat turns without the necessity for banking as is normally required.

Another object of this invention is to provide an aircraft in which the pilot is seated generally at the center of rotation in such a position that the g-forces encountered during turns or similar maneuvers are imposed laterally to the pilot's body so that their effect is further minimized.

Another object of this invention is to provide an aircraft which, in addition to the special maneuvers made possible by the rotation of the upper portion, retains the full control of a conventional aircraft using conventional control surfaces.

Finally, it is an object to provide an aircraft of the aforementioned character which is simple and convenient to operate and which may be economically constructed according to accepted aircraft standards.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 1 is a top plan view of the aircraft.

Fig. 2 is a side elevation view of the aircraft.

Fig. 3 is a front elevation view of the aircraft.

Fig. 4 is an enlarged sectional view taken on the line 4—4 of Fig. 1.

Fig. 5 is an enlarged fragmentary sectional view taken on the line 5—5 of Fig. 4.

Fig. 6 is a sectional view taken on the line 6—6 of Fig. 5.

Fig. 7 is an enlarged fragmentary sectional view taken on the line 7—7 of Fig. 4.

Fig. 8 is a sectional view taken on the line 8—8 of Fig. 7.

Fig. 9 is an enlarged fragmentary plan view of the pilot's cockpit showing the pivotally mounted seat and control pedestal.

Fig. 10 is an enlarged sectional view, similar to the portion of Fig. 4 at which the section 5—5 is taken, showing an alternative method of rotating the upper portion by means of a servo motor.

Figs. 11, 12 and 13 are diagrammatic views of the aircraft in three positions during a turn to illustrate the disposition of the upper and lower portions.

Referring now to the drawings, the aircraft comprises an upper shell 10 and a lower shell 12. The exact method of constructing the aircraft is not important to this disclosure, except that the various structural components must be designed according to accepted aircraft standards. The upper shell 10 contains the pilot's cockpit 14 and the motors 16, two turbo-jet motors being shown as an example. Also on the upper shell 10, adjacent the outer rim thereof and positioned approximately on the lateral diameter of the disc, are a pair of rotatable fins 18 which are used to rotate the upper shell.

The lower shell 12 is provided with an air intake duct 20 to carry air to the motors 16. At the center of the aircraft on the axis of rotation is a plenum chamber 22 comprising a lower chamber 24, which is an extension of the duct 20, and an upper chamber 26 communicating therewith. The upper chamber 26 is located in the upper shell 10 and leads to a bifurcated duct 28 communicating with the motors 16. Thus air is supplied to the motors 16 regardless of the relative disposition of the upper and lower shells.

Mounted on the longitudinal axis of the lower shell 12 and adjacent the rear thereof is a fixed fin 29 having a pivotally attached rudder 30. Installed in the rudder 30 is a tailwheel 31 which is enclosed by suitable doors 32. The aircraft is supported by the main landing gear legs 33 which retract into the lower shell 12. The disposition and arrangement of the landing gear legs 33 and the tailwheel 31 are illustrative, the actual structure being best determined in the detail design of the aircraft. The upper and lower shells together constitute an airfoil of suitable aerodynamic design to provide the necessary lift and stability for the aircraft. The lower shell 12 extends slightly above the horizontal axis of the airfoil so that the upper shell 10 is smaller in diameter than the lower shell. The extended rim 34 of the lower shell 12 is fitted with a pair of elevons 35 located at the trailing edge of the airfoil slightly outboard of the motors 16. The elevons 35 constitute the combined ailerons and elevators normally used on tailless type aircraft.

The upper shell 10 is attached to the lower shell 12 by a large diameter roller bearing 36 shown in Figs. 4, 5 and 6. This roller bearing 36 comprises a generally C-shaped channel rail 38 secured by suitable brackets 40 to the structural ribs 42 of the lower shell 12, said channel rail being mounted at an upwardly converging angle. Secured to the structural ribs 44 of the upper shell 10 by further brackets 40 is a bearing ring 46 on which are mounted a plurality of vertical load rollers 48 which are vertically displaced in pairs so that the rollers alternately bear on the upper and lower surfaces of the channel rail 38 as shown in Fig. 6. Intermediate the pairs of rollers 48 are lateral load rollers 50 mounted in brackets 51, these rollers 50 bearing outwardly against the channel rail 38 and being at right angles to the rollers 48. It will be evident that the rollers 48 and 50 together support the upper shell 10 against vertical and lateral loads. Engaging the channel rail 38 and secured to a convenient structural member in the upper shell 10 is a pilot operated friction brake 52 which is used to lock the upper shell against rotation during normal flight. This brake 52 may be actuated pneumatically, hydraulically or electrically, many existing types of brakes being suitable for the purpose.

The upper and lower portions of the plenum chamber 22 are connected by a roller bearing 54 to ensure alignment and prevent loss of incoming air due to leakage. The roller bearing 54 comprises a generally U-shaped channel rail 56 secured to the upper rim of the lower chamber 24. Extending outwardly and downwardly from the upper chamber 26 is a bearing ring 58, having thereon a plurality of vertical load rollers 60 alternately vertically staggered as shown in Fig. 8. Intermediate the rollers 60 are lateral load rollers 62 mounted in brackets 64 and bearing inwardly on the channel rail 56 as shown in Fig. 7. The combination of rollers thus absorbs all vertical and lateral loads in the roller bearing 54 in a manner similar to that described for the roller bearing 36.

Fitted around the lower chamber 24 below the channel rail 56 is a slip ring 66 which carries the necessary electrical contact rings to connect the pilot's controls to the various mechanisms in the lower shell 12. The wiper contacts 68 engaging the slip ring 66 are mounted on the bearing ring 58. It will be evident that electrically operated controls are necessary for the various mechanisms, such as landing gear retraction and elevon operation, due to the relative rotation of the upper and lower portions of the aircraft. The structure of the electrical slip ring 66 and the wiper contacts 68 are according to accepted standards, the details being fully understood by those familiar with the art.

The pilot's cockpit 14 has a floor structure 70 on which is a control pedestal 72, pivotally mounted on a base 74. Extending upwardly from the control pedestal 72 is a column 76 on which are the control wheel 78 and the associated aircraft controls. Also mounted on the control pedestal 72 is the pilot's seat 80 of suitable design. The cockpit 14 is, of course, fitted with a transparent canopy 82 for maximum visibility.

The fins 18 are connected by means of cables 84 to generally conventional rudder pedals 86 mounted on the control pedestal 72.

The duct 20 is faired into the forward lower surface of the lower shell 12 by a fairing 88, while the motors 16 are similarly faired into the rear upper surface of the upper shell 10 by cowlings 90.

In normal flight, the upper shell 10 is locked against rotation by the friction brake 52, control of the aircraft being accomplished by the elevons 35 and fins 18 in the normal manner. In order to make a sharp, flat turn, the friction brake 52 is disengaged so that the upper shell 10 may rotate freely. The turning action is illustrated in Figs. 11–13 in which the various arrows are used to clarify the maneuver. Arrow F indicates the direction of flight, arrow T indicates the direction of thrust and arrow RW indicates the direction of relative wind.

Fig. 11 shows the straight and level flight position in which the directions of flight, thrust and relative wind are all in alignment longitudinally of the aircraft. To start the turn, the fins 18 are offset by means of the pedals 86 to the position shown in Fig. 12. This offset causes the upper shell 10 to be rotated by the slipstream until the fins 18 are once more aligned with the relative wind. At this position the direction of thrust is to one side of the line of flight, with the result that the aircraft will be propelled to the side opposite to the direction of thrust. At the same time, the lower shell 12 is held stationary relative to the line of flight by the tendency of the fixed fin 29 to "weather-vane" into the relative wind as shown in Fig. 12. However, the direction of relative wind is changing due to the aircraft being propelled to one side by the thrust of the motors, thus the fixed fin 29 will gradually turn into the new direction of relative wind, so that the upper and lower portions of the aircraft are once more in alignment. This, the completed turn position, is shown in Fig. 13. The fins 18 are, of course, returned to neutral by the pilot as the aircraft assumes the required new heading. It will be seen that the "weather-vaning" of the lower shell 12 holds the air intake ducts 20 directly into the relative wind, so providing maximum ram effect to maintain the motors 16 at full operating efficiency.

In conventional aircraft which bank when turning, the g-forces on the pilot are considerable at high speeds. With the pilot in a sitting position and the aircraft in a steep bank these g-forces are effective longitudinally of the pilot's body, so causing black-out as is well known. With the present aircraft making a flat turn, the g-forces are effective laterally through the pilot's body with the pilot seated normally. It is well known that the g-forces are at least effective in this direction so minimizing the tendency of the pilot to black-out.

The pilot being seated at the axis of rotation of the aircraft, the effects of the g-forces are still further minimized. It will be evident that much sharper turns are possible than with conventional aircraft without undue discomfort to the pilot, this being a distinct advantage in combat or evasive maneuvers.

In the case of the present type of aircraft flying at extreme speeds, the effects of the centrifugal and g-forces encountered in a high speed turn are minimized to a bearable degree as explained above. However, the acceleration of the aircraft in the new heading after making a turn may commence before the turn is actually completed. While the aircraft is still turning, the pilot may not be actually facing in the true direction of acceleration, with the result that excess side loads are experienced. In aircraft using very high powered turbo-jet or rocket motors these side loads may be sufficient to cause loss of control. For this purpose the entire control pedestal is allowed to swing on its base 74 as shown dotted in Fig. 9. During a turn the seat 80 will tend to swing outwardly under centrifugal force so that the pilot faces the new direction of travel slightly before the aircraft reaches that heading and is thus in a position to absorb the acceleration forces. As the aircraft accelerates the seat will be held in general alignment with the direction of acceleration by the acceleration force. If necessary, some form of damping may be applied to the control pedestal 72 to prevent free swinging and oscillating during normal maneuvers.

For taxying and maneuvering on the ground the rudder 30 together with the tailwheel 31 are used. The tailwheel 31 is, of course steerable with the rudder, the pilot's controls for such a mechanism being well known to those skilled in the art.

During flight at extreme altitudes in rarefied atmosphere, the fins 18 are less effective. To maintain the required maneuverability at such altitudes the rotation of the upper shell 10 may be augmented by a servomotor or the like. Such an arrangement is shown in Fig. 10 in which a motor 92 is mounted on a convenient structural rib 44 adjacent the bearing ring 46. Mounted on the bearing ring 46 is a driven roller 94 operatively connected to the motor 92 by a drive chain 96 or the like. The motor 92 is of the reversible type and is preferably operatively connected to the pedals 86 to rotate the upper shell 10 in conjunction with the action of the fins 18. For certain applications it may be desirable to eliminate the fins 18, in which case the upper shell 10 may be entirely rotated by the motor 92 to alter the direction of thrust.

It will be evident that aside from performing all maneuvers possible with conventional aircraft, the presently disclosed aircraft is capable of additional maneuvers previously impossible. Besides making sharp turns in a horizontal plane, a similar sequence of operations may be carried out to obtain changes of direction in a vertical plane or in any direction therebetween. This is accomplished by first rolling the aircraft on its axis longitudinal to the line of flight, by means of the elevons, into the plane of the desired direction change. The aircraft is then turned into the new direction by rotating the upper shell 10 as previously described. By this means the aircraft may be made to dive or climb abruptly or to take an angular course in any desired direction without discomfort to the pilot.

It should be understood that the specific structure shown in the drawings is illustrative only, many forms of construction being suitable for such an aircraft.

Although the present disclosure specifically describes an aircraft, the principle of rotating that portion of the body of a powered vehicle containing the propulsion means is equally applicable to other vehicles such as surface or underwater vessels. Furthermore, the propulsion motors may be installed in either the upper or lower portion of the body without departure from the scope of the invention, the actual arrangement being dependent on the particular vehicle and its purpose.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the form of the invention disclosed herein may be made without departure from the spirit and scope of the invention disclosed herein, and that the specification and drawings are to be considered as merely illustrative rather than limiting.

I claim:

1. In an aircraft of generally circular form, a lower portion, an upper portion rotatably adjustably mounted on said lower portion, propulsion means in said upper portion, means for rotating said upper portion to alter the direction of propulsive thrust, and means tending to hold said lower portion against shifting in relation to the direction of motion of the aircraft while said upper portion is rotated.

2. In an aircraft of generally circular form, a lower portion, an upper portion rotatably adjustably mounted on said lower portion, propulsion means in said upper portion, means for rotating said upper portion to alter the direction of propulsive thrust, means tending to hold said lower portion against shifting in relation to the direction of motion of the aircraft while said upper portion is rotated, and means for locking said upper portion against rotative movement relative to the lower portion.

3. In an aircraft of generally circular form, a lower portion, an upper portion rotatably adjustably mounted on said lower portion, rearwardly thrusting propulsion motors in said upper portion, means for rotating said upper portion to alter the direction of propulsive thrust, a stabilizing fin on said lower portion to bias the same against shifting in relation to the direction of motion of the aircraft while said upper portion is rotated, and means for locking said portions against relative rotation.

4. In an aircraft of generally circular form, a lower portion, an upper portion rotatably adjustably mounted on said lower portion, said lower and upper portions together constituting an aerodynamic lifting surface, rearwardly thrusting propulsion motors in said upper portion, means for rotating said upper portion to alter the direction of propulsive thrust, a stabilizing fin on said lower portion to bias the same against shifting in relation to the direction of motion of the aircraft while said upper portion is rotated, and means for locking said portions against relative rotation.

5. In an aircraft of generally circular form, a lower portion, an upper portion rotatably adjustably mounted on said lower portion, said lower and upper portions together constituting an aerodynamic lifting surface, rearwardly thrusting propulsion motors in said upper portion, pivotal fin means on said upper portion for rotating the same to alter the direction of propulsive thrust, a stabilizing fin on said lower portion to bias the same against shifting in relation to the direction of motion of the aircraft while said upper portion is rotated, and means for locking said portions against relative rotation.

6. In an aircraft of generally circular form, a lower portion, an upper portion rotatably adjustably mounted on said lower portion, said lower and upper portions together constituting an aerodynamic lifting surface, rearwardly thrusting propulsion motors in said upper portion, pivotal fin means on said upper portion for rotating the same to alter the direction of propulsive thrust, a stabilizing fin on said lower portion to bias the same against shifting in relation to the direction of motion of the aircraft while said upper portion is rotated, means for locking said portions against relative rotation and hinged control surfaces in said lower portion for rolling and pitching control of the aircraft about its longitudinal and lateral axes, respectively.

7. In an aircraft of generally circular form, a lower portion, an upper portion adjustably rotatably mounted on said lower portion, rearwardly thrusting propulsion motors in said upper portion, pilot actuated controls in said upper portion, pivotal fin means on said upper portion, actuating means operatively connecting said controls to said fins for rotating the same whereby said upper portion is rotated to alter the direction of propulsive thrust, a stabilizing fin on said lower portion to bias the same against rotation relative to the direction of motion of the aircraft while said upper portion is rotated, and means for locking said portions against relative rotation.

8. In an aircraft of generally circular form, a lower portion and an upper portion, an annular bearing rotatably interconnecting said upper and lower portions, rearwardly thrusting propulsion motors in said upper portion, pilot actuated controls in said upper portion, pivotal fin means on said upper portion, actuating means operatively connecting said controls to said fins for rotating the same whereby said upper portion is rotated to alter the direction of propulsive thrust, a stabilizing fin on said lower portion to bias the same against rotation relative to the direction of motion of the aircraft while said upper portion is rotated, and means for locking said portions against relative rotation.

9. An aircraft according to claim 8 and including a driven roller in said bearing, and a motor operatively connected to said driven roller to rotate said upper portion relative to said lower portion.

10. An aircraft according to claim 3 and including a steerable landing wheel in said fin, and a main aircraft supporting landing gear in said lower portion.

11. An aircraft according to claim 8 wherein said locking means comprises a frictional brake engaging said bearing.

12. In an aircraft of generally circular form, a lower portion, an upper portion rotatably adjustably mounted on said lower portion, rearwardly thrusting jet propulsion motors in said upper portion, an air intake duct in said lower portion, a plenum chamber at the axis of rotation of said upper portion, said plenum chamber comprising a lower chamber communicating with said air intake duct and an upper chamber communicating with said motors, and an annular bearing interconnecting said lower and upper chambers in substantially sealed relation, means for rotating said upper portion to alter the direction of propulsive thrust, and means tending to hold said lower portion against shifting in relation to the direction of motion of the aircraft while said upper portion is rotated.

13. An aircraft according to claim 1 and including a pilot's cockpit in said upper portion at the axis of rotation thereof, a control pedestal pivotally mounted in said cockpit, and a seat on said control pedestal.

14. In a vehicle, a body having a lower portion, and an upper portion rotatably mounted on said lower portion, means for rotating one of said portions relative to the other of said portions, propulsion means in one of said portions, and means for biasing the other of said portions against rotation relative to the direction of motion of the vehicle while the portion containing said propulsion means is rotating.

15. An aircraft of generally circular form, comprising two portions mounted for rotative adjustment relative to each other, propulsion means in one of said portions, and means for maintaining the other of said portions substantially in alignment with the direction of flight while the portion containing said propulsion means is rotatively adjusted.

References Cited in the file of this patent

UNITED STATES PATENTS

| D. 162,560 | Miller | Mar. 20, 1951 |
| 1,585,281 | Craddock | May 18, 1921 |
| 2,567,392 | Naught | Sept. 11, 1951 |
| 2,619,302 | Loedding | Nov. 25, 1952 |

FOREIGN PATENTS

| 1,018,196 | France | Oct. 8, 1952 |